(12) United States Patent
Nakao et al.

(10) Patent No.: US 12,465,899 B2
(45) Date of Patent: Nov. 11, 2025

(54) SLURRY PROCESSING APPARATUS, MICROBUBBLE GENERATION EQUIPMENT, AND SLURRY PROCESSING METHOD

(71) Applicant: SUMITOMO METAL MINING CO., LTD., Tokyo (JP)

(72) Inventors: Yoshihiko Nakao, Niihama (JP); Shintaro Ishikawa, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 677 days.

(21) Appl. No.: 17/796,056

(22) PCT Filed: Feb. 17, 2021

(86) PCT No.: PCT/JP2021/005946
§ 371 (c)(1),
(2) Date: Jul. 28, 2022

(87) PCT Pub. No.: WO2021/166958
PCT Pub. Date: Aug. 26, 2021

(65) Prior Publication Data
US 2023/0063110 A1 Mar. 2, 2023

(30) Foreign Application Priority Data
Feb. 21, 2020 (JP) .................. 2020-027774

(51) Int. Cl.
*B01J 8/08* (2006.01)
*B01F 23/00* (2022.01)
(Continued)

(52) U.S. Cl.
CPC ............. *B01J 8/085* (2013.01); *B01F 23/041* (2022.01); *B01F 23/2326* (2022.01);
(Continued)

(58) Field of Classification Search
CPC .......... B01J 8/085; B01J 8/0055; B01J 4/004; B01F 23/041; B01F 23/2326; B01F 23/80;
(Continued)

(56) References Cited

U.S. PATENT DOCUMENTS

| | | |
|---|---|---|
| 4,331,534 A | 5/1982 | Barnscheidt |
| 2004/0132835 A1 | 7/2004 | Gamlin et al. |
| 2012/0111436 A1 | 5/2012 | Matsufuji et al. |

FOREIGN PATENT DOCUMENTS

| | | |
|---|---|---|
| JP | 855-500597 A | 9/1980 |
| JP | H02-24955 B2 | 5/1990 |

(Continued)

OTHER PUBLICATIONS

Translation of JP_2019081670 (Year: 2019).*
(Continued)

*Primary Examiner* — Stuart L Hendrickson
*Assistant Examiner* — Joshua Maxwell Speer
(74) *Attorney, Agent, or Firm* — Troutman Pepper Locke LLP

(57) ABSTRACT

Provided is a slurry treatment apparatus includes: a treatment tank for performing any treatment of a solid-liquid reaction, a solid-gas reaction, a gas-liquid reaction, and solid-liquid separation on a slurry containing a metal or a metal compound; a first pipe; a second pipe; and a pump, in which one end of the first pipe has a suction opening for sucking the slurry from the treatment tank, the other end of the first pipe is connected to a suction port of the pump, one end of the second pipe is linked to a discharge port of the pump, the other end of the second pipe is connected to a microbubble generator, and the microbubble generator includes a throttle that throttles a flow of the slurry and a gas (Continued)

supply tube for supplying gas to the throttle, and supplies microbubbles to the slurry in the treatment tank.

7 Claims, 4 Drawing Sheets

(51) Int. Cl.
| | |
|---|---|
| *B01F 23/2326* | (2022.01) |
| *B01F 23/80* | (2022.01) |
| *B01F 25/31* | (2022.01) |
| *B01F 101/00* | (2022.01) |
| *B01F 101/45* | (2022.01) |
| *B01J 8/00* | (2006.01) |
| *B03B 5/34* | (2006.01) |
| *B03D 1/14* | (2006.01) |
| *C22B 3/00* | (2006.01) |
| *C22B 3/22* | (2006.01) |

(52) U.S. Cl.
CPC ............ *B01F 23/80* (2022.01); *B01F 25/311* (2022.01); *B01J 8/0055* (2013.01); *C22B 3/22* (2013.01); *C22B 23/0453* (2013.01); *B01F 2101/2204* (2022.01); *B01F 2101/45* (2022.01); *B03B 5/34* (2013.01); *B03D 1/14* (2013.01)

(58) Field of Classification Search
CPC ............ B01F 25/311; B01F 2101/2204; B01F 2101/45; B01F 23/23121; B01F 23/708; B01F 25/21; B01F 25/31242; B01F 25/53; C22B 3/22; C22B 23/0453; B03B 5/34; B03D 1/14; Y02P 10/20
See application file for complete search history.

(56) References Cited

FOREIGN PATENT DOCUMENTS

| | | |
|---|---|---|
| JP | 2000-279946 A | 10/2000 |
| JP | 2004-534876 A | 11/2004 |
| JP | 2008-36468 A | 2/2008 |
| JP | 2008-246466 A | 10/2008 |
| JP | 2009-273984 A | 11/2009 |
| JP | 2011-20070 A | 2/2011 |
| JP | 2017-42688 A | 3/2017 |
| JP | 2019-81670 A | 5/2019 |
| JP | 2019081670 A * | 5/2019 |
| WO | WO-2007141957 A1 * | 12/2007 ............ B01F 25/312 |

OTHER PUBLICATIONS

Translation of WO_2007141957 (Year: 2007).*
J. J. Cilliers, Hydrocyclones for Particle Size Separation, 2000, Particle Size Separation, 1819-1825 (Year: 2000).*
Jiang Huang, Licheng Sun, Hongtao Liu, Zhengyu Mo, Jiguo Tang, Guo Xie, Min Du, A review on bubble generation and transportation in Venturi-type bubble generators, Nov. 15, 2019, Experimental and Computational Multiphase Flow, vol. 2, No. 3, 123-134 (Year: 2019).*

* cited by examiner

SLURRY PROCESSING APPARATUS, MICROBUBBLE GENERATION EQUIPMENT, AND SLURRY PROCESSING METHOD

TECHNICAL FIELD

The present invention relates to an apparatus for treating a slurry containing a metal or a metal compound, and a method of treating the slurry.

BACKGROUND ART

In manufacture of a nonferrous metal or an inorganic chemical product, generally, a slurry containing a solid and a liquid is stored in a storage tank to cause a chemical reaction between the solid and the liquid, a chemical reaction between the solid and gas, or a chemical reaction between the liquid and gas (see Patent Literature 1).

Meanwhile, bubbles having a diameter of 1 to 100 μm are called microbubbles (based on the ISO definition of 2013), and have been expected to be applied to industry because the microbubbles have largely different physical and chemical properties from general bubbles having a diameter of several hundred μm or more, for example, in that the microbubbles have longer residence time in a liquid, a larger specific surface area, and stronger sterilization and disinfection capacities.

However, at present, there is not yet a reported case of a slurry treatment apparatus capable of supplying microbubbles to a slurry containing a metal or a metal compound with a simple apparatus configuration, in the manufacture of a nonferrous metal or an inorganic chemical product.

CITATION LIST

Patent Literature

Patent Literature 1: JP 2017-42688 A

SUMMARY OF INVENTION

Technical Problem

An object of the present invention is to provide an apparatus and a method for slurry treatment, having a simple apparatus configuration and capable of performing solid-liquid separation of a slurry or of promoting a solid-liquid reaction, a solid-gas reaction, and a gas-liquid reaction.

Solution to Problem

A first aspect of the present invention is a slurry treatment apparatus including: a treatment tank for performing any treatment of a solid-liquid reaction, a solid-gas reaction, a gas-liquid reaction, and solid-liquid separation on a slurry containing a metal or a metal compound; a first pipe; a second pipe; and a pump, in which one end of the first pipe has a suction opening for sucking the slurry from the treatment tank, the other end of the first pipe is connected to a suction port of the pump, one end of the second pipe is linked to a discharge port of the pump, the other end of the second pipe is connected to a microbubble generator, and the microbubble generator includes a throttle that throttles a flow of the slurry and a gas supply tube for supplying gas to the throttle, and supplies microbubbles to the slurry in the treatment tank.

A second aspect of the present invention is the slurry treatment apparatus according to the first aspect, further including a slurry separator that separates the slurry into a slurry containing, as a solid content, only particles smaller than a narrow flow path portion of the throttle and a remaining slurry other than the slurry.

A third aspect of the present invention is the slurry treatment apparatus according to the second aspect, in which the slurry separator includes an intermediate chamber disposed outside the suction opening of the first pipe so as to surround the suction opening, openings are formed on a wall surface and/or a bottom surface of the intermediate chamber, and a liquid content of the slurry in the intermediate chamber and a solid content of the slurry having a predetermined size or less are discharged to the outside of the intermediate chamber through the openings.

A fourth aspect of the present invention is the slurry treatment apparatus according to the third aspect, in which a maximum value of each diameter of the openings on the wall surface and/or the bottom surface of the intermediate chamber is smaller than the size of a narrowest portion of the throttle.

A fifth aspect of the present invention is the slurry treatment apparatus according to the third or fourth aspect, in which an upper end of the intermediate chamber is located above a liquid level of the slurry and is opened to outside air.

A sixth aspect of the present invention is the slurry treatment apparatus according to the second aspect, in which the slurry separator is a cyclone that separates the slurry fed from the pump into a pretreatment slurry containing, as a solid content, only particles smaller than the size of a narrowest portion of the throttle and a remaining slurry other than the pretreatment slurry.

A seventh aspect of the present invention is the slurry treatment apparatus according to the sixth aspect, in which the slurry separator further includes: a pretreatment slurry tank that stores the pretreatment slurry; and a pretreatment slurry pump that extracts the pretreatment slurry in the pretreatment slurry tank and supplies the pretreatment slurry to the microbubble generator.

An eighth aspect of the present invention is the slurry treatment apparatus according to any one of the first to seventh aspects, in which the slurry containing a metal or a metal compound is a slurry used for flotation.

A ninth aspect of the present invention is a microbubble generating unit that supplies microbubbles to a slurry containing a metal or a metal compound, the microbubble generating unit including: a microbubble generator including a throttle that throttles a flow of the slurry; and a gas supply tube for supplying gas to the throttle; and a cyclone that separates the slurry into a pretreatment slurry containing, as a solid content, only particles smaller than the size of a narrowest portion of the throttle and a remaining slurry other than the pretreatment slurry.

A tenth aspect of the present invention is a slurry treatment method including performing any treatment of a solid-liquid reaction, a solid-gas reaction, a gas-liquid reaction, and solid-liquid separation on a slurry containing a metal or a metal compound using the slurry treatment apparatus according to any one of the first to eighth aspects of the present invention.

Advantageous Effects of Invention

The present invention can promote a solid-liquid reaction or solid-liquid separation of a slurry. In addition, the present invention can supply microbubbles into the slurry with a simple apparatus configuration.

DESCRIPTION OF EMBODIMENTS

Hereinafter, an example of equipment that supplies microbubbles into a slurry in the slurry treatment tank while circulating the slurry in the tank will be described as a representative.

Examples of a microbubble generator include an ejector type, and a pressurized dissolution type, and a static mixer type other than the ejector type. However, the pressurized dissolution type microbubble generator intermittently generates bubbles and further has a complicated apparatus configuration. In addition, it is difficult for the static mixer type microbubble generator to apply in supplement of high-concentration microbubbles. A microbubble generator according to each present embodiment will be described by exemplifying the ejector type microbubble generator.

First Embodiment

Figure 1:
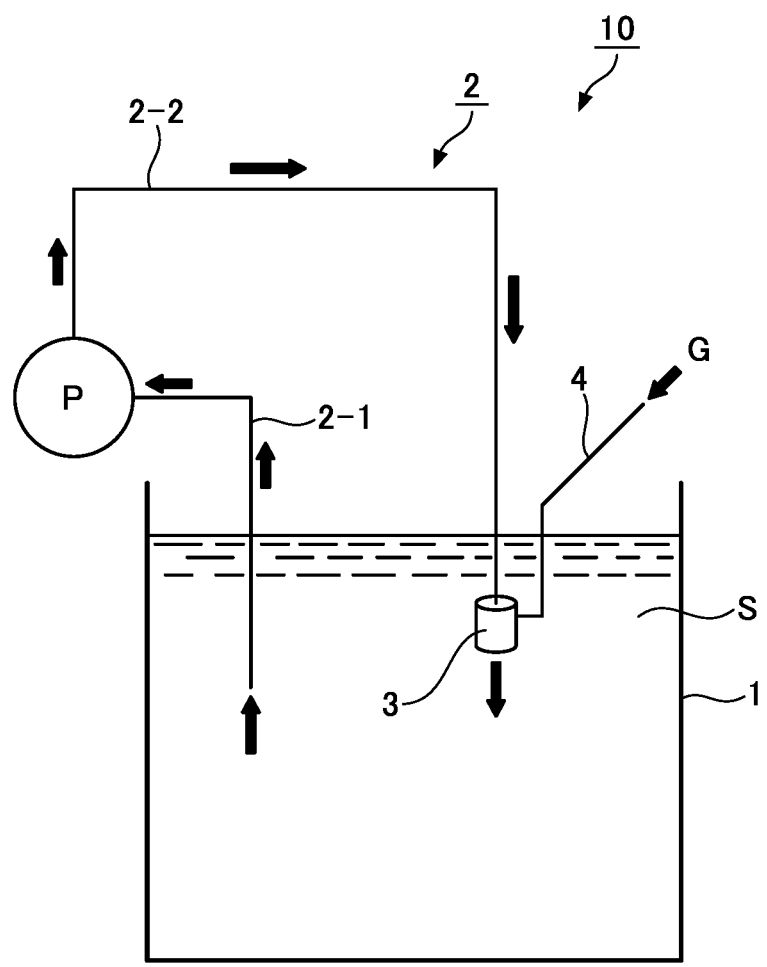
FIG. 1 is a diagram schematically illustrating a configuration example of a slurry treatment apparatus according to the first embodiment.

As illustrated in FIG. 1, a slurry treatment apparatus 10 is for treating a slurry S containing a metal or a metal compound and includes a piping system 2 and a pump (circulation pump) P for circulating the slurry S in a treatment tank 1. As the metal compound, the slurry S may contain at least one selected from the group consisting of a compound of a metal and sulfur, a compound of a metal and oxygen, and a compound of a metal and nitrogen, and the slurry treatment apparatus 10 is particularly suitable particularly when a slurry used for flotation is treated.

The piping system 2 includes a first pipe 2-1 and a second pipe 2-2. The first pipe 2-1 and the second pipe 2-2 are connected to the pump P. One end of the first pipe 2-1 has a suction opening for sucking the slurry from the treatment tank 1, and the other end of the first pipe 2-1 is connected to a suction port of the pump P. One end of the second pipe 2-2 is connected to a discharge port of the pump P, and the other end of the second pipe 2-2 is connected to a microbubble generator 3.

Figure 3:
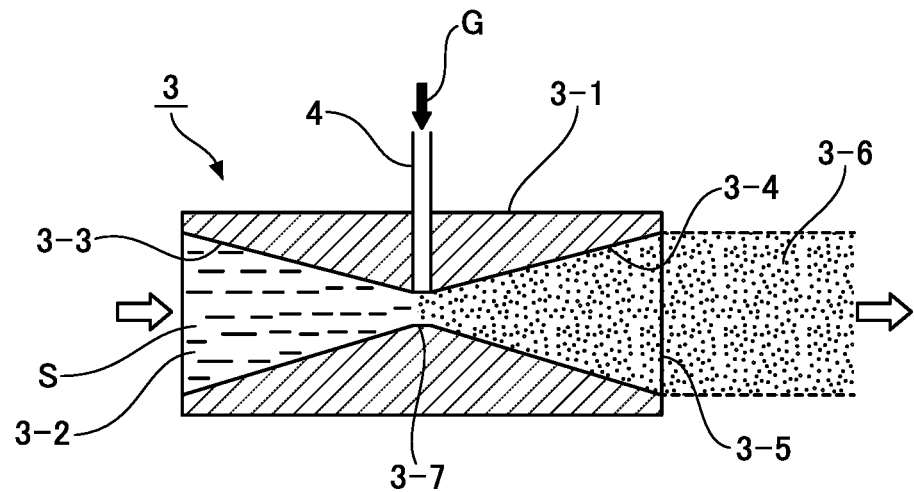
FIG. 3 is a schematic diagram of an ejector type microbubble generator.

As illustrated in FIG. 3, the microbubble generator 3 includes a throttle 3-7 that throttles a flow of the slurry S and a gas supply tube 4 for supplying gas to the throttle 3-7, and supplies microbubbles to the slurry in the treatment tank 1.

To the microbubble generator 3, for example, an ejector type microbubble generator can be applied. Bubbles having a diameter of 1 to 100 μm are called microbubbles (based on the ISO definition of 2013), and are expected to be applied to industry because the microbubbles have largely different physical and chemical properties from general bubbles having a diameter of several hundred μm or more. There are various methods for generating microbubbles, and among the methods, the ejector type has a simple apparatus configuration and high practicality.

One end of the gas supply tube 4 is connected to the microbubble generator 3, and the other end thereof is exposed and opened to the atmosphere as a gas inlet. The slurry is supplied from the pump P to the microbubble generator 3, a slurry flow rate is maximized at the throttle (narrow portion) 3-7 in the microbubble generator 3, and air is supplied from the gas supply tube 4 to the microbubble generator 3 in a self-suction manner.

When gas other than air is converted into microbubbles and supplied to the treatment tank 1, the gas inlet of the gas supply tube 4 can be used by being connected to a desired gas cylinder or gas supply apparatus.

FIG. 3 illustrates a configuration of the ejector type microbubble generator. Reference numeral 3-1 denotes an ejector main body, reference numeral 3-2 denotes a liquid supply port for a slurry or the like, reference numeral 3-3 denotes a liquid flow path having a conical cross-sectional shape, reference numeral 3-4 denotes a microbubble flow path having an inverted conical cross-sectional shape, reference numeral 3-5 denotes a microbubble discharge port, and reference numeral 4 denotes the gas supply tube for air, gas, or the like, disposed at a connection part between the liquid flow path 3-3 and the microbubble flow path 3-4 in a direction perpendicular to both the flow paths. That is, in the ejector type microbubble generator, gas G such as air or gas supplied from the gas supply tube 4 at the connection part between the liquid flow path 3-3 and the microbubble flow path 3-4 is blown off by the slurry S supplied from the liquid supply port 3-2 which is provided on the ejector main body 3-1 and has the conical cross-sectional shape, to generate fine bubbles, namely, microbubbles (fine bubbles) 3-6, and the bubbles are ejected from the microbubble flow path 3-4.

The slurry treatment apparatus 10 according to the first embodiment can supply microbubbles into the slurry. The slurry treatment apparatus 10 according to this embodiment can exhibit an action and effect of effectively suppressing a blockade of the throttle 3-7 in the microbubble generator 3 even when the slurry contains a high-concentration solid content.

Second Embodiment

Figure 2:
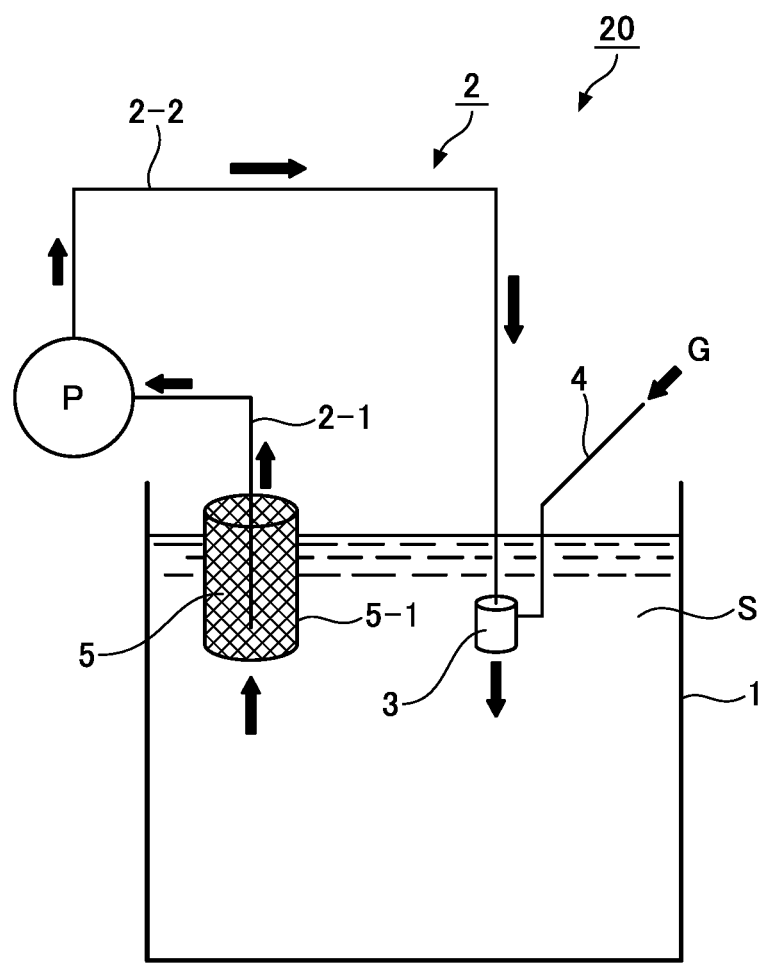
FIG. 2 is a diagram schematically illustrating a configuration example of a slurry treatment apparatus according to the second embodiment.

Hereinafter, a slurry treatment apparatus 20 according to this embodiment will be described with reference to FIG. 2.

The second embodiment further includes a slurry separator that separates a slurry into a slurry containing, as a solid content, only particles smaller than the narrow flow path portion of the throttle 3-7 in the microbubble generator 3 and a remaining slurry other than the slurry.

In addition to the configuration of the first embodiment, the slurry treatment apparatus 20 according to the second embodiment includes an intermediate chamber 5 that is disposed outside a suction opening of a first pipe 2-1 so as to surround the suction opening and has its upper end located above a slurry liquid level. Among the components of the slurry treatment apparatus 20 according to the second embodiment, those having similar configurations and functions to those of the slurry treatment apparatus 10 according to the first embodiment are denoted by the same reference numerals, and detailed description thereof will be omitted.

The intermediate chamber 5 may be made of metal, resin, or cloth. Furthermore, a periphery of a metal or resin frame may be covered with a metal, resin, cloth, or paper wall surface, and the intermediate chamber 5 only needs to have corrosion resistance to liquid properties of a slurry such as acid concentration and liquid temperature.

The intermediate chamber 5 has openings 5-1 on a side surface and/or a bottom thereof. The shape of the openings 5-1 may be a circular shape, a quadrangular shape, a triangular shape, or other shape, and it is not particularly limited.

A maximum diameter of each opening 5-1 is smaller than the throttle (narrowest portion) 3-7 of the slurry flow path in the ejector type microbubble generator.

The maximum diameter of the opening 5-1 depends on the particle shape of the solid content of the slurry. For example, when the particles of the slurry solid content are spherical, the maximum diameter of each opening 5-1 only needs to be smaller than the size of the throttle 3-7 of the slurry flow path in the ejector type microbubble generator. When the maximum diameter of the opening 5-1 is about 0.9 times the size of the throttle 3-7, clogging of the microbubble generator (the ejector type microbubble generator) 3 having the throttle 3-7 can be prevented.

In addition, when the particle shape of the solid content of the slurry is a needle shape, the maximum diameter of each opening 5-1 is selected such that only particles having a longitudinal size smaller than the size of the throttle 3-7 pass through the ejector type microbubble generator. For example, the maximum diameter of the opening 5-1 can be set as a value obtained by multiplying a maximum diameter of a body portion of the needle-shaped particle of the slurry solid content having a longitudinal size the same as the size of the throttle 3-7, by 0.9

As described above, the maximum diameter of each opening 5-1 only needs to be appropriately selected according to the size of the throttle (narrowest portion) 3-7 and the shape and size of the particles of the slurry solid content.

The intermediate chamber 5 can be placed such that the upper end thereof is located above the slurry liquid level and is opened to outside air. As a result, when the pump P having the function of circulating the slurry sucks a liquid in the intermediate chamber 5 through the first pipe 2-1, the liquid level in the intermediate chamber 5 becomes lower than the slurry liquid level in the treatment tank 1.

Due to this height difference in liquid level, the slurry flows into the intermediate chamber 5 from the outside of the intermediate chamber 5 so that the liquid levels are the same level. At this time, since a solid content of the slurry larger than the diameter of each opening 5-1 of the intermediate chamber 5 cannot pass through an outer wall (basket) of the intermediate chamber 5, it is possible to prevent the slurry solid content larger than the diameter of the opening 5-1 of the basket from being supplied to the microbubble generator 3.

When a case in which a strainer is placed at the suction opening of the pipe is considered, the slurry solid content is filtered by suction filtration through the strainer. Generally, a solid content filtered by suction filtration is firmly tightened and deposited on the surface of a filter, resulting in poor liquid permeability. In addition, by performing suction filtration, the solid content in the slurry tends to be caught in the openings, which increases clogging and further deteriorates the liquid permeability.

On the other hand, in the process for removing the solid content in the slurry through the intermediate chamber 5 according to the present embodiment, filtration is performed in a form close to natural filtration since the upper end of the intermediate chamber 5 is located above the slurry liquid level and is opened to outside air. As a result, the solid content in the slurry can be suppressed from flowing into the intermediate chamber 5, the slurry solid content can be prevented from being firmly tightened and deposited on the surface of the intermediate chamber 5, and the slurry solid content is not caught in the openings 5-1. Therefore, deterioration of liquid permeability and clogging can be reduced.

The size of the intermediate chamber 5 may be appropriately adjusted according to a speed of liquid passing through the openings 5-1 on the wall surface and/or the bottom surface of the intermediate chamber 5. The size of the intermediate chamber 5 may be also selected to have the area of the wall surface and/or the bottom surface of the intermediate chamber 5 such that a height difference in liquid level between the inside and the outside of the intermediate chamber 5 does not vary.

The shape of the intermediate chamber 5 is not particularly limited, and may be, for example, a tubular shape, a triangular prism shape, a quadrangular prism shape, or a bowl shape. In addition, a part of the intermediate chamber 5 may be integrated with the treatment tank 1.

Since the upper side of the intermediate chamber 5 is open, the liquid level height inside the intermediate chamber 5 can be visually confirmed. Therefore, when the surface of the intermediate chamber 5 is clogged due to long-term operation of the slurry treatment apparatus, clogging can be visually confirmed immediately.

The treatment tank 1 may include a stirring device to stir the slurry (not illustrated), or the slurry may be stirred by utilizing a fluid discharged from the slurry treatment apparatus.

The slurry treatment apparatus 20 according to the second embodiment can exhibit, for example, the following action and effects.

When the ejector type microbubble generator is used as the microbubble generator 3, since the liquid flow path has the narrow portion, it is actually difficult to cause a slurry to pass due to a problem of a blockade. For example, when a slurry containing a solid having a particle size distribution of several μm to several hundred μm is caused to pass in a general ejector type microbubble generator, a blockade occurs in an ejector in about several tens of seconds, and microbubbles cannot be supplied.

It is conceivable to dispose a filter at a suction port of a suction pipe. However, slurry particles are not supplied to the ejector, a blockade of the ejector can be prevented, but the filter at the slurry supply port is clogged by continuous operation, and long-term continuous operation cannot be performed.

In addition, when a filter device having a clogging prevention function is used between the ejector type microbubble generator and the suction port for slurry supply, there is a problem that the apparatus configuration is complicated.

Meanwhile, according to the second embodiment, since the intermediate chamber 5 is disposed, the above problem can be reduced or avoided.

For example, in order to prevent a blockade of the (narrowest portion) 3-7 (1.9 mm) of the microbubble generator 3, an aspect can be adopted in which the intermediate chamber 5 including the openings 5-1 is disposed, and an aperture of each opening 5-1 is set to 0.84 mm. In this case, the size of the intermediate chamber 5 is 100 mm in diameter and 250 mm in height, and the particle size of the slurry is 60 μm in D90, 20 μm in D50, and 5 μm in D10. Note that the particle shape of the slurry does not need to be a perfect spherical shape, and may be an asymmetric particle shape having different sizes between a vertical height and a horizontal height.

Equipment adopting the slurry treatment apparatus 20 of the present embodiment is not particularly limited. For example, the slurry treatment apparatus 20 can be adopted in a reactor that blows gas into a slurry containing a solid content to cause a chemical reaction between the gas and the solid content, or an apparatus that causes a solid content of a slurry to adsorb gas bubbles and floats the solid content to perform solid-liquid separation. The slurry treatment apparatus according to the present embodiment can be applied to, for example, a slurry treatment in metallurgy, a slurry treatment in manufacturing nickel powder used for a material of an electronic component or the like, or a slurry treatment of a slurry used for flotation.

Third Embodiment

Figure 4:
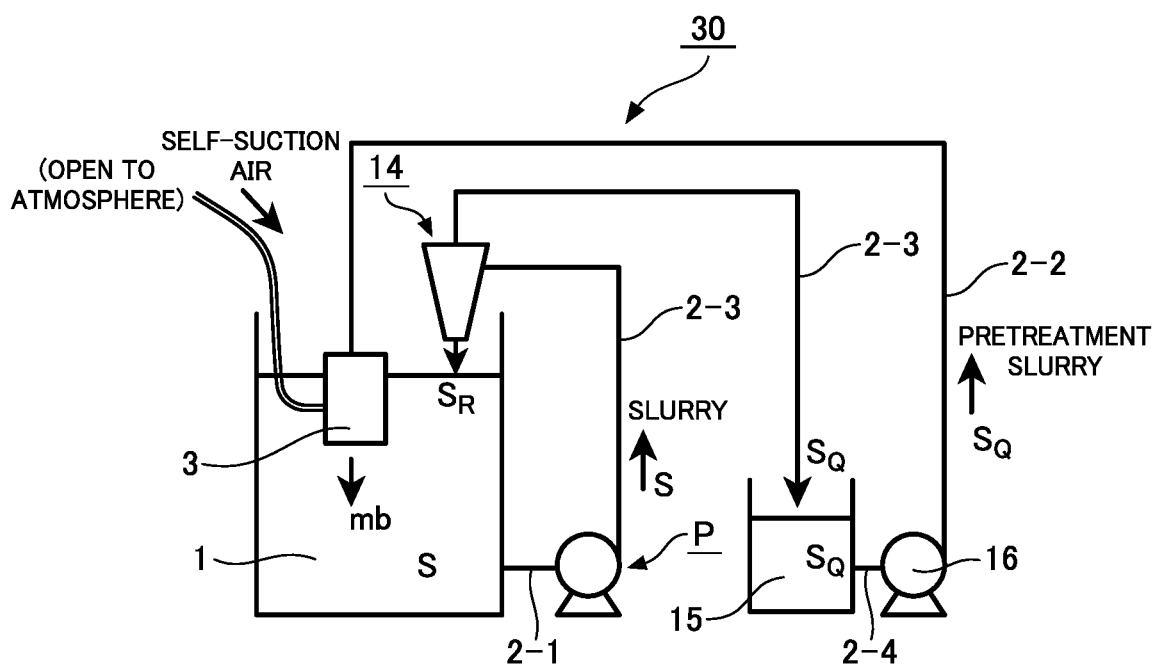
FIG. 4 is a diagram schematically illustrating a configuration example of a slurry treatment apparatus according to the third embodiment.

Hereinafter, a slurry treatment apparatus 30 according to the present embodiment will be described with reference to FIG. 4. The third embodiment further includes a slurry separator that separates a slurry into a slurry containing, as a solid content, only particles smaller than a narrow flow path portion of a throttle in a microbubble generator and a remaining slurry other than the slurry, and is a mode different from the mode exemplified in the second embodiment.

In the present embodiment, a cyclone 14 is used as the slurry separator. The cyclone 14 separates a slurry S fed from a pump into a pretreatment slurry $S_Q$ containing, as a solid content, only particles smaller than the size of a throttle 3-7 in a microbubble generator 3 and smaller than a narrowest portion of the throttle and a remaining slurry $S_R$ other than the pretreatment slurry $S_Q$. A third pipe 2-3 for transporting the slurry S from the treatment tank 1 to the cyclone 14 is connected to the cyclone 14. Here, the pump P is connected to an end of the third pipe 2-3 opposite to a side to which the cyclone 14 is connected, and a first pipe 2-1 having one end connected to a side wall of the treatment tank 1 is connected to the pump P. By operating the pump P, the slurry S in the treatment tank 1 can be supplied into the cyclone 14 through the first pipe 2-1 and the third pipe 2-3.

Figure 5:
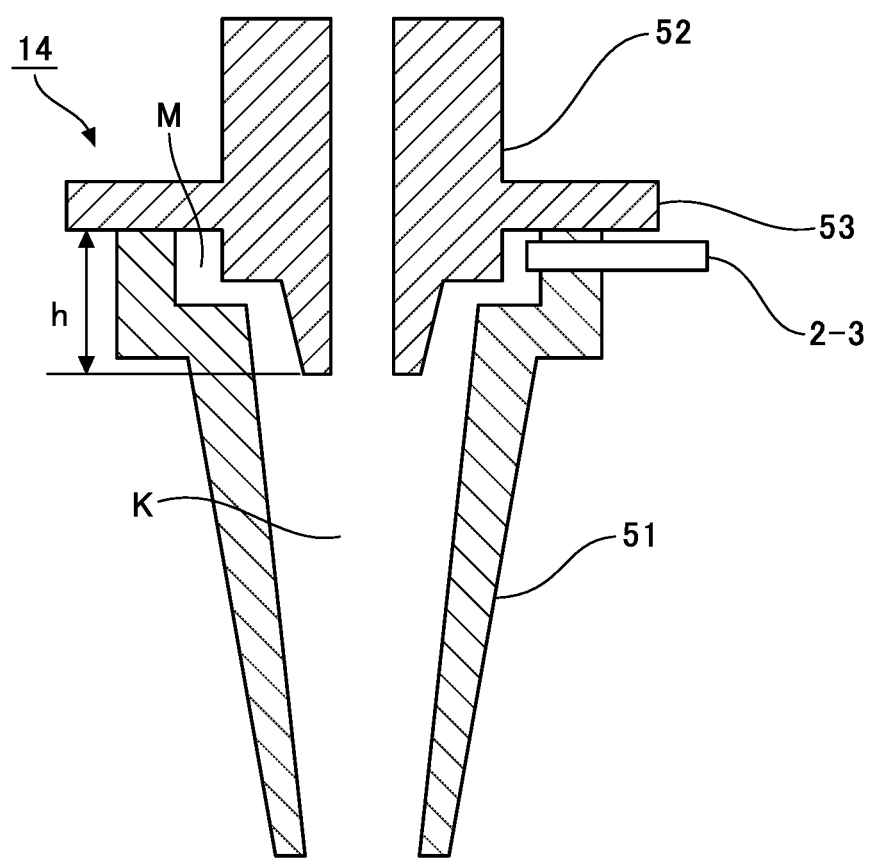
FIG. 5 is an explanatory diagram for explaining a structure of a cyclone.

In the present embodiment, as illustrated in FIG. 5, the cyclone 14 has a conical portion 51 having both ends opened and a conical space K (hereinafter, also referred to as a centrifugal separating portion) formed inside, and an upper lid 52 having a flange 53 formed on a side peripheral surface of a cylindrical body, and the upper lid 52 is fitted into one end of the conical portion 51 on a side having a larger diameter.

A gap M (hereinafter, also referred to as a centrifugal accelerating portion) having a spiral shape when viewed from the axial direction of the cyclone is formed in the portion into which the upper lid 52 is fitted, and a centrifugal force can be applied to the slurry S by supplying the slurry S to the gap M.

Here, the size of the gap M can be adjusted by a fitting depth h of the upper lid 52 with respect to the conical portion 51, that is, a formation position of the flange 53 abutting on an end of the conical portion 51 on a side where the upper lid 52 is fitted, and a supply speed of the slurry S supplied to the centrifugal separating portion (space K) can be adjusted by adjusting the size of the gap M and a supply pressure of the slurry S.

The slurry S to which the centrifugal force is applied is supplied to the centrifugal separating portion K, particles smaller than a predetermined size are separated by the centrifugal force, and the pretreatment slurry $S_Q$ containing the separated particles as a solid content flows through the inside of the upper lid 52 and is discharged. Meanwhile, the remaining slurry $S_R$ other than the pretreatment slurry $S_Q$ is discharged from an end of the conical portion 51 having a smaller diameter and is returned into the treatment tank 1.

In the present embodiment, the size of each part of the centrifugal separating portion K and the centrifugal accelerating portion M and the supply pressure of the slurry S are optimized such that only particles smaller than the narrow flow path portion of the throttle 3-7 in the microbubble generator 3 are contained in the pretreatment slurry $S_Q$. For example, by designing each part such that only particles having a size of 0.9 times or less the diameter of the narrow flow path portion are contained in the pretreatment slurry $S_Q$, it is possible to effectively prevent occurrence of a blockade in the microbubble generator 3.

The pretreatment slurry $S_Q$ formed by removing coarse particles by the cyclone 14 is discharged from the cyclone 14, delivered through the third pipe 2-3, and temporarily stored in a pretreatment slurry tank 15. A fourth pipe 2-4 is connected to a side wall of the pretreatment slurry tank 15. A pretreatment slurry pump 16 is connected to an end of the fourth pipe 2-4 opposite to a side to which the pretreatment slurry tank 15 is connected. Furthermore, a second pipe 2-2 having one end connected to the microbubble generator 3 is connected to the pretreatment slurry pump 16. By operating the pretreatment slurry pump 16, the slurry $S_Q$ in the pretreatment slurry tank 15 can be supplied into the microbubble generator 3.

As a result, the slurry treatment apparatus 30 of the present embodiment can normally operate the microbubble generator 3 for a long time without causing a blockade in the flow path. In addition, since the slurry treatment apparatus 30 of the present embodiment does not need to introduce a liquid for adjusting the characteristics of the slurry from outside the system, the slurry concentration and the liquid amount of the slurry into which microbubbles are introduced are not largely affected.

Equipment adopting the slurry treatment apparatus 30 of the present embodiment is not particularly limited. For example, the slurry treatment apparatus 20 can be adopted in a reactor that blows gas into a slurry containing a solid content to cause a chemical reaction between the gas and the solid content, or an apparatus that causes a solid content of a slurry to adsorb gas bubbles and floats the solid content to perform solid-liquid separation. The slurry treatment apparatus according to the present embodiment can be applied to, for example, a slurry treatment in metallurgy, a slurry treatment in manufacturing nickel powder used for a material of an electronic component or the like, or a slurry treatment of a slurry used for flotation.

Next, a slurry treatment method using the slurry treatment apparatus 30 of the present embodiment will be described.

In this example, a slurry S used for flotation is used as the slurry S containing a metal or a metal compound, and an ejector type microbubble generator is used as the microbubble generator 3.

First, the pump P is operated to introduce the slurry S in the treatment tank 1 into the cyclone 14 through the first pipe 2-1 and the third pipe 2-3.

Then, the cyclone 14 separates the slurry S into a remaining slurry containing coarse particles and a pretreatment slurry from which the coarse particles have been removed, returns the remaining slurry $S_R$ to the treatment tank 1, and discharges the pretreatment slurry $S_Q$ into the pretreatment slurry tank 15 through the third pipe 2-3. The pretreatment slurry $S_Q$ is stored in the pretreatment slurry tank 15.

Next, the pretreatment slurry pump 16 is operated to supply the pretreatment slurry $S_Q$ stored in the pretreatment slurry tank 15 into the microbubble generator through the fourth pipe 2-4 and the second pipe 2-2. As a result, it is possible to mix the slurry with air supplied by self-suction action of the generator to form microbubbles and to stably supply the microbubbles into the slurry S without causing a blockade even in the narrow flow path portion of the throttle in the microbubble generator 3.

Note that a discharge flow rate of the pretreatment slurry pump 16 is preferably adjusted so as to be equal to a discharge flow rate of the pretreatment slurry $S_Q$ discharged from the cyclone 14.

REFERENCE SIGNS LIST

1 Treatment tank
2 Piping system
2-1 First pipe
2-2 Second pipe
2-3 Third pipe
2-4 Fourth pipe
3 Microbubble generator
3-1 Ejector main body
3-2 Liquid (such as slurry) supply port
3-3 Liquid flow path
3-4 Microbubble flow path
3-5 Microbubble discharge port
3-6 Microbubbles (fine bubbles)
3-7 Throttle (narrow portion)
4 Gas supply tube
5 Intermediate chamber
5-1 Openings
10, 20, 30 Slurry treatment apparatus
14 Cyclone
15 Pretreatment slurry tank
16 Pretreatment slurry pump
51 Conical portion
52 Upper lid
53 Flange
K Conical space (centrifugal separating portion)
M Gap (centrifugal accelerating portion)
P Pump
S Slurry
G Gas
$S_Q$ Pretreatment slurry
$S_R$ Remaining slurry
mb Microbubbles
h Fitting depth

The invention claimed is:

1. A slurry treatment apparatus comprising:
a treatment tank for performing any treatment of a solid-liquid reaction, a solid-gas reaction, a gas-liquid reaction, and solid-liquid separation on a slurry containing a metal or a metal compound;
a first pipe;
a second pipe; and
a pump, wherein
one end of the first pipe has a suction opening for sucking the slurry from the treatment tank, and another end of the first pipe is connected to a suction port of the pump,
one end of the second pipe is linked to a discharge port of the pump, and another end of the second pipe is connected to a microbubble generator,
the microbubble generator includes a throttle that throttles a flow of the slurry and a gas supply tube for supplying gas to the throttle, and supplies microbubbles to the slurry in the treatment tank, and
a slurry separator that separates the slurry into a slurry containing, as a solid content, only particles smaller than a narrow flow path portion of the throttle and a remaining slurry other than the slurry, wherein
the slurry separator includes an intermediate chamber disposed outside the suction opening of the first pipe so as to surround the suction opening,
openings are formed on a wall surface and/or a bottom surface of the intermediate chamber, and
a liquid content of the slurry in the intermediate chamber and a solid content of the slurry having a predetermined size or less are discharged to an outside of the intermediate chamber through the openings.

2. The slurry treatment apparatus according to claim 1, wherein a maximum diameter of each of the openings on the wall surface and/or the bottom surface of the intermediate chamber is smaller than a size of a narrowest portion of the throttle.

3. The slurry treatment apparatus according to claim 1 wherein an upper end of the intermediate chamber is located above a liquid level of the slurry and is opened to outside air.

4. The slurry treatment apparatus according to claim 1, wherein the slurry containing a metal or a metal compound is a slurry used for flotation.

5. A slurry treatment method comprising performing treatments of a solid-liquid reaction, a solid-gas reaction, a gas-liquid reaction, and solid-liquid separation on a slurry containing a metal or a metal compound using the slurry treatment apparatus according to claim 1.

6. A microbubble generating unit that supplies microbubbles to a slurry containing a metal or a metal compound, the microbubble generating unit comprising:
a microbubble generator including a throttle that throttles a flow of the slurry and a gas supply tube for supplying gas to the throttle; and
a cyclone that separates the slurry into a pretreatment slurry containing, as a solid content, only particles smaller than a size of a narrowest portion of the throttle and a remaining slurry other than the pretreatment slurry, wherein
the cyclone includes an intermediate chamber configured to be disposed outside a suction opening of a first pipe so as to surround the suction opening,
openings are formed on a wall surface and/or a bottom surface of the intermediate chamber, and
a liquid content of the slurry in the intermediate chamber and a solid content of the slurry having a predetermined size or less are discharged to an outside of the intermediate chamber through the openings.

7. A slurry treatment apparatus comprising:
a treatment tank for performing any treatment of a solid-liquid reaction, a solid-gas reaction, a gas-liquid reaction, and solid-liquid separation on a slurry containing a metal or a metal compound;
a first pipe;
a second pipe; and
a pump, wherein
one end of the first pipe has a suction opening for sucking the slurry from the treatment tank, and another end of the first pipe is connected to a suction port of the pump,
one end of the second pipe is linked to a discharge port of the pump, and another end of the second pipe is connected to a microbubble generator, and the microbubble generator includes a throttle that throttles a flow of the slurry and a gas supply tube for supplying gas to the throttle, and supplies microbubbles to the slurry in the treatment tank, wherein the slurry containing a metal or a metal compound is a slurry used for flotation.

* * * * *